(12) United States Patent
Golebiowski et al.

(10) Patent No.: US 9,771,929 B2
(45) Date of Patent: Sep. 26, 2017

(54) STRESS REDUCTION IN HYDROSTATIC CRADLE BEARING (71) Applicant: Caterpillar Inc., Peoria, IL (US)

(72) Inventors: Marek Golebiowski, Lombard, IL (US); Christopher W. Pruess, Plainfield, IL (US)

(73) Assignee: Caterpillar Inc., Peoria, IL (US)

( * ) Notice: Subject to any disclaimer, the term of this patent is extended or adjusted under 35 U.S.C. 154(b) by 566 days.

(21) Appl. No.: 14/268,746

(22) Filed: May 2, 2014

(65) Prior Publication Data

US 2015/0316040 A1 Nov. 5, 2015

(51) Int. Cl.
*F04B 1/22* (2006.01)
*F04B 1/20* (2006.01)
*F04B 27/08* (2006.01)
*F16C 17/02* (2006.01)
*F01B 3/00* (2006.01)
*F16C 19/50* (2006.01)
*F03C 1/06* (2006.01)
*F04B 1/14* (2006.01)

(52) U.S. Cl.
CPC .......... *F04B 1/2085* (2013.01); *F01B 3/0073* (2013.01); *F03C 1/0671* (2013.01); *F04B 1/148* (2013.01); *F04B 1/22* (2013.01); *F04B 27/0865* (2013.01); *F16C 17/02* (2013.01); *F16C 19/502* (2013.01); *F16C 2240/60* (2013.01)

(58) Field of Classification Search
CPC .... F01B 3/0073; F03C 1/0671; F03C 1/0649; F16C 17/02; F16C 2208/36; F16C 2240/60; F16C 19/502; F04B 1/20; F04B 1/2014; F04B 1/2085; F04B 1/22; F04B 1/2078; F04B 1/305; F04B 1/32; F04B 1/322; F04B 27/0821; F04B 27/0865; F04B 27/086; F04B 27/0808; F04B 27/08763; F04B 1/148
USPC .... 417/218, 222.1, 222.2, 269; 91/499, 504, 91/505; 92/70
See application file for complete search history.

(56) References Cited

U.S. PATENT DOCUMENTS

| 4,896,583 A | 1/1990 | Lemke |
| 5,017,095 A | 5/1991 | Burgess et al. |
| 7,172,394 B2 * | 2/2007 | Chung .................. F04B 1/2085 417/222.1 |

(Continued)

FOREIGN PATENT DOCUMENTS

| DE | 102008051434 A1 | 4/2010 |
| JP | 2013124611 A | 6/2013 |

(Continued)

*Primary Examiner* — Theodore Stigell
*Assistant Examiner* — Chirag Jariwala
(74) *Attorney, Agent, or Firm* — Miller, Matthias & Hull LLP (57) ABSTRACT

In a piston pump assembly, cradle bearings support a swash plate on an inner surface of a housing assembly. The cradle bearing and/or the corresponding portion of the housing inner surface may have undercut portions allowing deflection of an inward portion of the cradle bearing when the swash plate is subjected to pressure forces from hydraulic fluid compressed within pump cylinders by the pump pistons. Deflection of the cradle bearings allows increased contact pressure to be further distributed across the engaging surfaces of the swash plates and the cradle bearings.

21 Claims, 4 Drawing Sheets

(56) References Cited

U.S. PATENT DOCUMENTS

| | | |
|---|---|---|
| 7,513,691 B2 | 4/2009 | Beck |
| 7,517,156 B2 | 4/2009 | Kazama |
| 8,118,567 B2 | 2/2012 | Mori et al. |
| 2009/0110564 A1 | 4/2009 | Simon et al. |
| 2010/0018385 A1 | 1/2010 | Mori et al. |
| 2012/0230619 A1 | 9/2012 | Belser |

FOREIGN PATENT DOCUMENTS

| | | |
|---|---|---|
| WO | WO-2007/028469 A1 | 3/2007 |
| WO | WO-2009/083153 A1 | 7/2009 |
| WO | WO-2013/045166 A1 | 4/2013 |

\* cited by examiner

STRESS REDUCTION IN HYDROSTATIC CRADLE BEARING

TECHNICAL FIELD

The present disclosure relates generally to hydraulic piston pumps, and more particularly, to a hydrostatic cradle bearing for a swash plate of a hydraulic piston pump providing reduced stress on the cradle bearing during operation of the piston pump to provide pressurized hydraulic fluid.

BACKGROUND

Machines such as dozers, loaders, excavators and other types of machinery typically include a hydro-mechanical power transmission system to transfer power, e.g., torque and rotational speed generated by a power source, to one or more connected loads, such as a machine tool or other implement. A major component of these hydro-mechanical power transmission systems is a hydraulic pump. The hydraulic pump or pumps generate pressurized hydraulic fluid that is used to operate the components of the machine.

One type of hydraulic pump is a hydraulic piston pump that includes a pump housing defining a pump cavity housing one or more piston pumps. The hydraulic piston pumps each include reciprocating pistons arranged within corresponding piston chambers of a pump barrel that is operably connected to a rotating shaft so that the pump barrel and the pistons rotate with the shaft. The pistons within each pump extend outwardly from one end of the corresponding pump barrel and impinge on a swash plate. As the barrel and the pistons rotate and the swash plate remains stationary, the pistons reciprocate within the piston chambers with a stroke length determined by the orientation of the swash plate, and thereby causing hydraulic fluid to be drawn into the pump barrel on the expansion strokes of the pistons and to be discharged from the pump barrel under pressure on the compression strokes.

In one typical arrangement for a piston pump, semi-circular cradle bearings having concave bearing surfaces are installed in the housing between the housing wall and the swash plate to facilitate rotation of the swash plate within its designed range of motion. The swash plate has corresponding convex bearing surfaces that are received by the cradle bearings and are slidable therein. At any point in the rotation of the pump barrel and pistons about the rotational axis of the shaft, four to five pistons in a nine piston pump are performing compression strokes and are under pressure at the same time due to the to the compression of the hydraulic fluid. The pressure force is transmitted through the pistons to the swash plate and ultimately to the cradle bearings and the housing wall. The force causes stresses in the interfacing elements, particularly where an edge of one element bears on a surface of the adjoining element.

In an exemplary piston pump disclosed in Int'l Publ. No. WO 2009/083153 A1 by Breuer and published on Jul. 9, 2009, a piston pump includes bearing elements configured to compensate for deflection of a pivoting base or swash plate. A pivoting-base mounting of the axial piston pump includes a housing, a pivoting base or swash plate, and a pivoting bearing region that is formed by the housing and the pivoting swash plate. The pivoting swash plate and/or the housing and/or the bearing element that is arranged in the pivoting bearing region are of deformable configuration in such a way as to compensate for a deflection of the pivoting swash plate. The publication discusses deformations in the elements being caused by stresses, but does not discuss reduction of stresses caused by forces from the pistons. In view of this, a need exists for configuring the components of the hydraulic piston pump in a manner that reduces the stresses created in the interfacing elements, and in particular in the cradle bearings.

SUMMARY OF THE DISCLOSURE

In one aspect of the present disclosure, a cradle bearing for use with a swash plate in a piston pump assembly is disclosed. The cradle bearing may have a bearing outer end surface, a bearing inner end surface disposed opposite the bearing outer end surface and spaced from the bearing outer end surface by a bearing width, a bearing concave inner surface extending from the bearing outer end surface to the bearing inner end surface, and a bearing convex outer surface disposed opposite the bearing concave inner surface and extending from the bearing outer end surface to the bearing inner end surface. The bearing convex outer surface may include a housing engaging surface extending from the bearing outer end surface toward the bearing inner end surface, wherein the cradle bearing may have an engagement thickness from the bearing concave inner surface to the housing engaging surface of the bearing convex outer surface, and an undercut surface extending from the bearing inner end surface toward the bearing outer end surface to a point of transition with the housing engaging surface. The cradle bearing may have an undercut thickness from the bearing concave inner surface to the undercut surface of the bearing convex outer surface that is less than the engagement thickness of the cradle bearing.

In another aspect of the present disclosure, a piston pump assembly for a piston pump is disclosed. The piston pump assembly may have a piston housing having a pair of oppositely disposed housing concave surfaces, a swash plate having a pair of oppositely disposed swash plate convex surfaces, each of the pair of oppositely disposed swash plate convex surfaces corresponding to one of the housing concave surfaces, and a pair of cradle bearings with each of the pair of cradle bearings corresponding to and disposed between one of the swash plate convex surfaces and the corresponding housing concave surface to facilitate rotational motion of the swash plate relative to the piston housing. Each of the cradle bearings may have a bearing concave inner surface having a complimentary shape to the swash plate convex surface, a housing engaging surface disposed opposite the bearing concave inner surface by a cradle bearing thickness and having a complimentary shape to the housing concave surface, and an undercut surface disposed opposite the bearing concave inner surface by an undercut thickness and extending from a bearing inner end surface toward a bearing outer end surface to a point of transition with the housing engaging surface, wherein the undercut thickness is less than the cradle bearing thickness to define a gap between the undercut surface the corresponding housing concave surface.

In a further aspect of the present disclosure, a piston pump assembly for a piston pump is disclosed. The piston pump assembly may have a piston housing having a pair of oppositely disposed housing concave surfaces, a swash plate having a pair of oppositely disposed swash plate convex surfaces, each of the pair of oppositely disposed swash plate convex surfaces corresponding to one of the housing concave surfaces, and a pair of cradle bearings with each of the pair of cradle bearings corresponding to and disposed between one of the swash plate convex surfaces and the corresponding housing concave surface to facilitate rotational motion of the swash plate relative to the piston housing. Each of the cradle bearings may have a bearing concave inner surface having a complimentary shape to the swash plate convex surface, and a bearing convex outer surface disposed opposite the bearing concave inner surface and having a complimentary shape to the housing concave surface, wherein each housing concave surface and corresponding bearing convex outer surface define an undercut gap there between extending outwardly from a bearing inner end surface to an undercut transition portion beyond which the housing concave surface and the bearing convex outer surface face and engage.

Additional aspects are defined by the claims of this patent.

DETAILED DESCRIPTION

Figure 1:
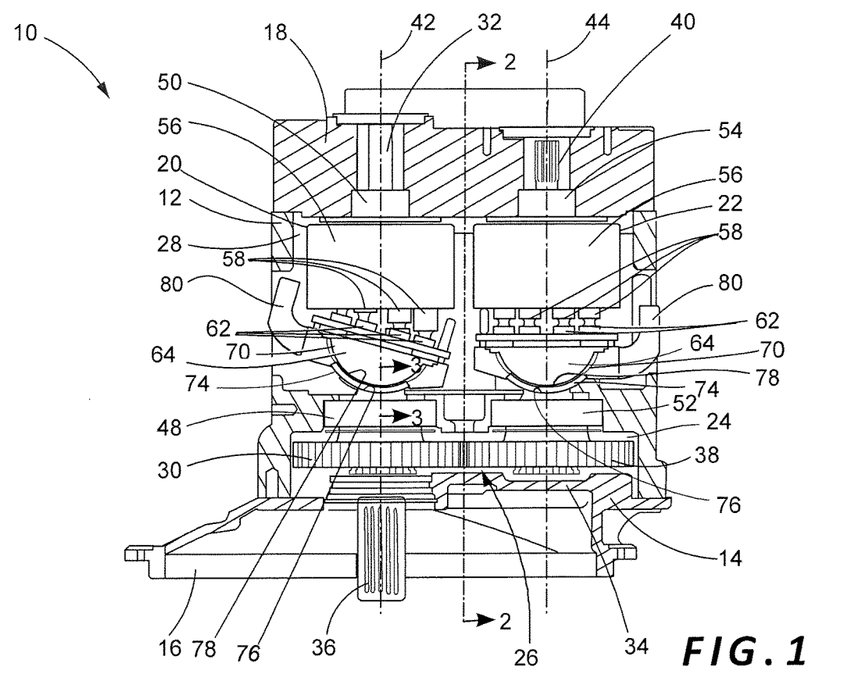
FIG. 1 is a front partial cross-sectional view of a piston pump assembly with the pump housing shown in cross-section to reveal the pump cavity and the components of the piston pumps.

FIG. 1 illustrates one example of a piston pump assembly 10 in which hydrostatic cradle bearings with reduced stresses in accordance with the present disclosure may be implemented. The piston pump assembly 10 may have a multi-piece construction and include a main housing portion 12, a lower housing portion 14 with a flange 16 that may house an engine flywheel (not shown), and an upper housing portion or head 18. Directional terms such as "upper" and "lower" are used for reference and clarity of discussion only, and not to indicate or limit the orientation of the piston pump assembly 10 when installed in a particular machine. The housing portions 12, 14, 18 of the piston pump assembly 10 may include various openings there through to allow access and control of components within the piston pump assembly 10, and flow and replacement of fluids such as lubricating fluids and hydraulic fluids flowing through a first or drive piston pump 20 and a second or driven piston pump 22. Of course, those skilled in the art will understand that cradle bearings in accordance with the present disclosure may be implemented in single pump or multiple pump assemblies.

The housing portions 12, 14, 18 may define a gear cavity 24 housing a spur gear set 26 and a pump cavity 28 housing the piston pumps 20, 22. The spur gear set 26 includes a first or drive gear 30 mounted on a first or drive shaft 32 that extends through an outer or bottom wall 34 of the lower housing portion 14, and through the gear cavity 24 and the pump cavity 28. A splined end 36 of the drive shaft 32 extends outwardly from the outer wall 34 and through the flange 16 for operative coupling of the drive shaft 32 to an engine or the power source of a machine in which the piston pump assembly 10 is installed for rotation of the spur gear set 26 and the piston pumps 20, 22. The spur gear set 26 further includes a second or driven gear 38 mounted on a second or driven shaft 40 within the piston pump assembly 10 and extending through the gear cavity 24 and the pump cavity 28. A first longitudinal axis 42 of the drive shaft 32 and a second longitudinal axis 44 of the second shaft 40 are aligned parallel so that the gears 30, 38 mesh and the first gear 30 causes the second gear 38 and the second shaft 40 to rotate when the drive shaft 32 is rotated by the power source.

The drive shaft 32 is mounted for rotation in the piston pump assembly 10 by drive shaft bearings 48, 50, and the second shaft 40 is mounted for rotation by driven shaft bearings 52, 54. The drive piston pump 20 is disposed on the drive shaft 32 between the drive shaft bearings 48, 50, and includes a pump barrel 56 mounted on the drive shaft 32 for rotation there with, and a plurality of pump pistons 58 disposed within corresponding pump cylinders (not shown) of the first pump barrel 56 for reciprocal movement therein. The pump cylinders are parallel to and circumferentially spaced about the first longitudinal axis 42.

A tip end portion 60 of each pump piston 58 projecting from the corresponding pump cylinder is spherical and rotatably attached to a fit recess of a corresponding shoe 62 and forms a ball joint with the shoe 62. An adjustable swash plate 64 is disposed to face a contact surface of the shoe 62 located opposite the fit recess of the shoe 62. The shoe 62 is pressed toward a flat smooth surface 68 of the swash plate 64 facing the contact surface of the shoe 62. When the pump barrel 56 rotates, the shoes 62 are guided by and along the smooth surface 68 to rotate, and the pump pistons 58 reciprocate in a direction of the first longitudinal axis 42. Circular-arc swash plate convex surfaces 70 are formed on a surface opposite the smooth surface 68 of the swash plate 64 on either side of a shaft insertion hole 72 (FIG. 2) through which the drive shaft 32 is inserted. The swash plate convex surfaces 70 are slidably received and supported by corresponding curved cradle bearings 74 disposed between the swash plate 64 and a corresponding housing concave surface 76 of the housing portion 12 and having a complimentary bearing concave inner surface 78 receiving the corresponding swash plate convex surface 70. In a similar manner, the second piston pump 22 is disposed on the second shaft 40 between the driven shaft bearings 52, 54 and includes a second pump barrel 56 mounted for rotation with the second shaft 40, a plurality of pump pistons 58 with shoes 62, and a second adjustable swash plate 64 controlling the flow of the hydraulic fluid through the second piston pump 22 and supported by curved cradle bearings 74.

The adjustable swash plates 64 are movable by swash plate control assemblies (not shown) that may be operatively connected to positioning arms 80 of the swash plates 64 to pivot the adjustable swash plates 64 about axes, such as a swash plate rotational axis 82 (FIG. 2), perpendicular to the longitudinal axes 42, 44 to control the amount and direction of hydraulic fluid flow produced by the piston pumps 20, 22 by varying tilt angles of the adjustable swash plates 64 in a manner known in the art. As shown, the smooth surface 68 of the adjustable swash plate 64 of the drive piston pump 20 is oriented at a tilt angle relative to the longitudinal axis 42 so that expansion strokes of the corresponding pump pistons 58 occur as the pump pistons 58 move from left to right as shown in FIG. 1, and compression strokes occur as the pump pistons 58 move from right to left as shown. Rotating the corresponding adjustable swash plate 64 counterclockwise to an opposite orientation of the smooth surface 68 reverses the expansion and compression strokes of the pump pistons 58 and, correspondingly, the flow of hydraulic fluid through the drive piston pump 20.

Figure 2:
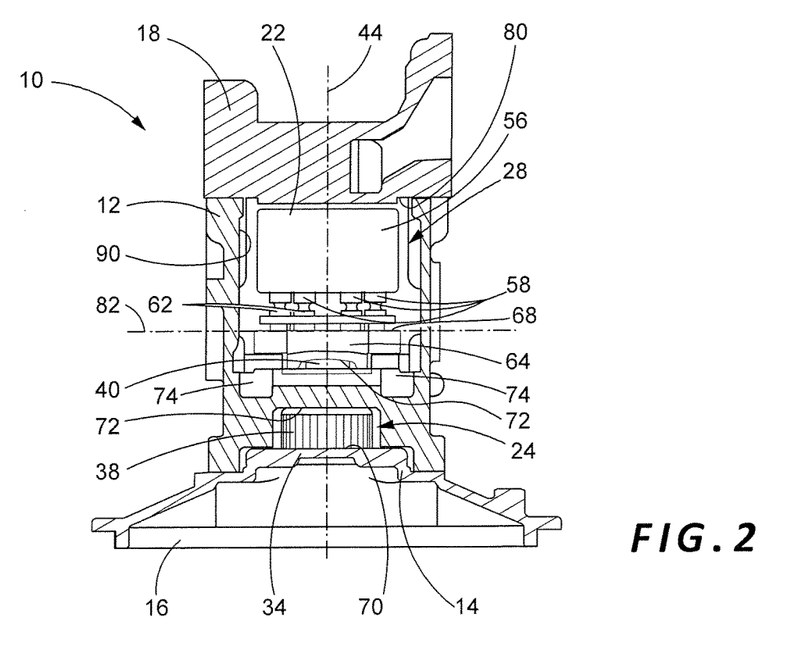
FIG. 2 is a side partial cross-sectional view of the piston pump assembly of FIG. 1 taken through line 2-2 and with the housing portions shown in cross-section to reveal the internal components of the housing assembly.

As shown in FIG. 1 and FIG. 2, which is a side cross-sectional view showing the second piston pump 22, the second gear 38 and the second shaft 40, the second adjustable swash plate 64 is in a neutral position with the smooth surface 68 of the adjustable swash plate 64 perpendicular to the second longitudinal axis 44 of the second shaft 40. In this position, the pump pistons 58 do not reciprocate as the second pump barrel 56 and the pump pistons 58 rotate about the second longitudinal axis 44, and the hydraulic fluid is not pumped by the second piston pump 22. From this position, the swash plate 64 may be rotated in either direction about the swash plate rotational axis 82 to create flow of pressurized hydraulic fluid in the desired direction.

As the pump barrels 56 rotate, four to five of the pump pistons 58 in nine piston pumps 20, 22 are executing compression strokes to compress the hydraulic fluid and pump the fluid out to the controlled implements. As compression occurs, the pressure force in the pump cylinders is transmitted by the pump pistons 58 to the swash plate 64 and ultimately to the cradle bearings 74 that are compressed between the swash plate convex surfaces 70 and the corresponding housing concave surfaces 76. The compression of the cradle bearing 74 creates stresses in the compressed elements. Moreover, the stresses may be further increased as the space between the cradle bearings 74 and the shaft insertion hole 72 through the swash plate 64 allows bending of the swash plate 64 and additional stresses to be generated at inward edges of the swash plate 64. Previously known cradle bearings have substantially uniform thicknesses across their entire widths that may maximize the contact surfaces between the cradle bearing, the swash plate convex surfaces 70 and the housing concave surfaces 76 before the swash plate 64 begins to bow. Despite this, high stresses are generated in the pump housing/cradle bearing/swash plate area that can lead to scuffing and relocating of the cradle bearings 74 as the pressure in the pump cylinders increases and causes the swash plate 64 to bow, and can ultimately lead to pump failure.

Figure 3:
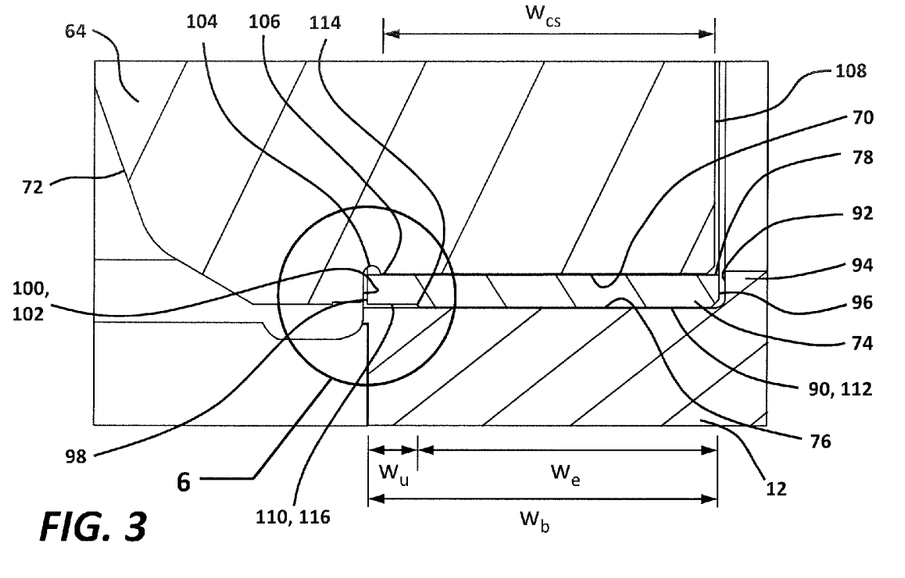
FIG. 3 is a side cross-sectional view of the piston pump assembly of FIG. 1 taken through line 3-3 and illustrating a portion of a swash plate and corresponding portion of the pump housing, and a cradle bearing in accordance with the present disclosure.

FIG. 3 illustrates a cross-sectional view of a portion of the piston pump assembly 10 taken through line 3-3 of FIG. 1 and showing portions of the main housing portion 12, the swash plate 64, and the corresponding cradle bearing 74 in accordance with the present disclosure. As shown, the swash plate convex surface 70 faces and engages the bearing concave surface 78, and the housing concave surface 76 faces and engages a complimentary bearing convex outer surface 90. The main housing portion 12 may further include a housing lateral surface 92 defining a lateral shoulder 94 that may engage a bearing outer end surface 96 to limit the outward movement of the cradle bearing 74. A bearing inner end surface 98 disposed opposite the bearing outer end surface 96 may face a swash plate inward surface 100 defining a swash plate inward shoulder 102 that may engage the bearing inner end surface 98 to limit the lateral movement of the swash plate 64. At the intersection of the swash plate convex surface 70 and the swash plate inward shoulder 102, a swash plate annular groove 104 may be provided to eliminate a sharp corner and reduce stress concentrations at the intersecting surfaces 70, 100. The swash plate convex surface 70 and the swash plate annular groove 104 intersect at an arcuate line defining a swash plate inner edge 106 of the swash plate convex surface 70, giving the swash plate convex surface 70 a convex surface width $w_{cs}$ from the swash plate inner edge 106 to a swash plate outer end surface 108.

Figure 4:
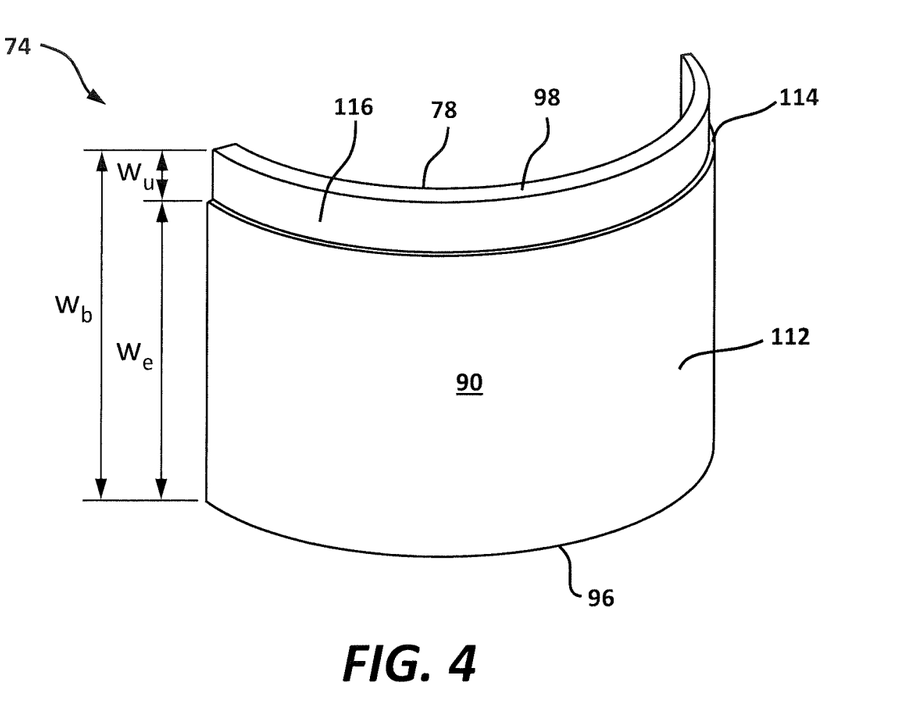
FIG. 4 is a side view of the cradle bearing in accordance with the present disclosure of FIG. 3.
Figure 5:
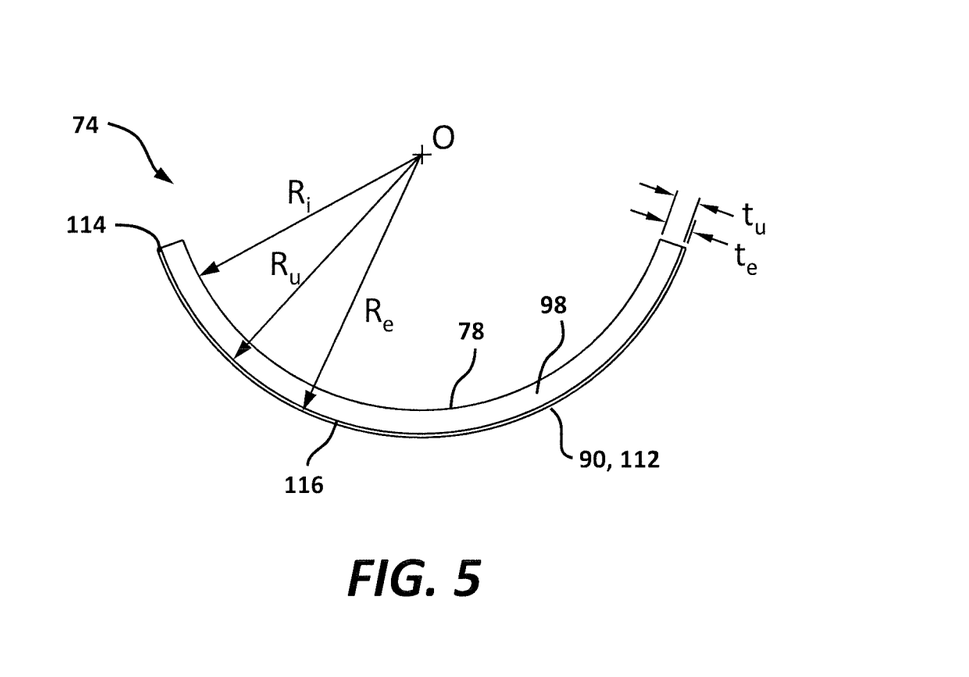
FIG. 5 is an edge view of the cradle bearing in accordance with the present disclosure of FIG. 3.

The cradle bearing 74 in accordance with the present disclosure is configured to reduce the stress concentrations in the pump housing/cradle bearing/swash plate area by providing an undercut 110 in the bearing convex surface 90 that mates with the housing concave surface 76. As shown in FIGS. 4 and 5, the bearing convex surface 90 of the curved cradle bearing 74 may be divided into a housing engaging surface 112 extending inwardly from bearing outer end surface 96 to an undercut transition portion 114 of the bearing convex surface 90, and an undercut surface 116 extending inwardly from the bearing inner end surface 98 toward the undercut transition portion 114. With this configuration, an overall bearing width $w_b$ is divided into a housing engaging width $w_e$ of the housing engaging surface 112 that defines the surface area of bearing convex surface 90 in contact with the housing concave surface 76, and an undercut width $w_u$ of the undercut surface 116 that defines the surface area of the bearing convex surface 90 that is not in contact with the housing concave surface 76 when the cradle bearing 74 is not subjected to deformation due to loading of the swash plate 64 by pressurized hydraulic fluid.

As shown in FIG. 5, the cradle bearing 74 may have substantially uniform thicknesses in the engagement region and the undercut region. Consequently, the cradle bearing 74 has an engagement thickness $t_e$ between the bearing concave surface 78 and the housing engaging surface 112, and an undercut thickness $t_u$ between the bearing concave surface 78 and the undercut surface 116. Further, in the illustrated embodiment, the cradle bearing 74 has a circular shape that sweeps an arc of less than 180° so that the swash plate convex surface 70 may be received by and turn within the bearing concave surface 78. The bearing concave surface 78, the housing engaging surface 112 and the undercut surface 116 may share a common center of curvature O. The bearing concave surface 78 has a constant inner radius the undercut surface 116 has a larger constant undercut radius $R_u$, and the housing engaging surface 112 has a still larger constant engagement radius $R_e$. Though illustrated herein as being circular, those skilled in the art will understand that cradle bearings 74 in accordance with the present disclosure may have alternative curvatures that may allow the swash plate convex surface 70 to be received and rotate relative to the bearing concave surface 78. For example, the cradle bearing 74 or the bearing concave surface 78 may have the shape of a portion of an ellipse or a parabola that allows rotational movement of swash plate convex surface 70.

The undercut transition portion 114 of the bearing convex surface 90 as shown in FIG. 4 may be generally perpendicular to the housing engaging surface 112 and the undercut surface 116 during the change from the engagement thickness $t_e$ and the engagement radius $R_e$ to the undercut thickness $t_u$ and the undercut radius $R_u$. Alternatively, as shown in FIG. 3, the undercut transition portion 114 may have a curved geometry with a constant or a varying radius of curvature in the transition from the housing engaging surface 112 to the undercut surface 116. Further alternative geometries for the undercut transition portion 114 will be apparent to those skilled in the art and are contemplated by the inventors as having use in cradle bearings 74 in accordance with the present disclosure.

Figure 6:
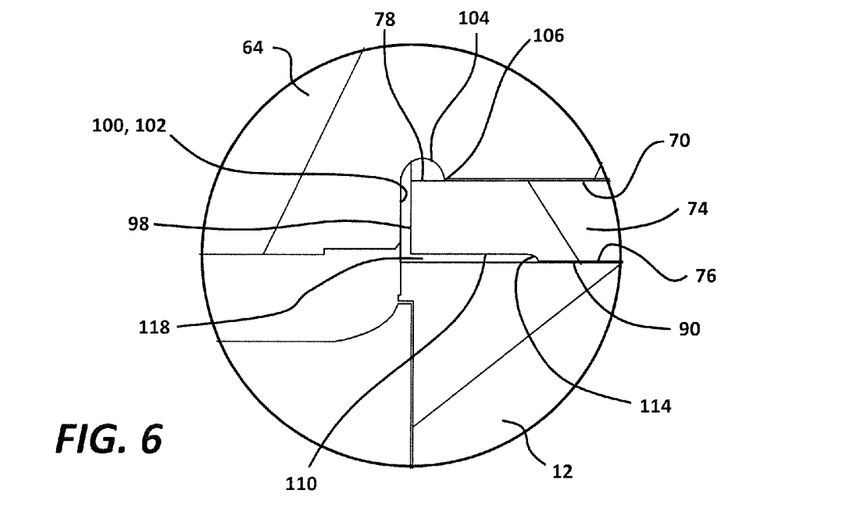
FIG. 6 is an enlarged view of Detail 6 of the piston pump assembly of FIG. 3.

Returning to FIG. 3 and the enlarged detail view of FIG. 6, the undercut surface 116 and a corresponding facing portion of the housing concave surface 76 define a gap 118 providing separation and absence of engagement between the housing concave surface 76 and the bearing convex surface 90. In this way, the portion of the cradle bearing 74 associated with the gap 118 may function as a cantilever capable of deflection under loads transmitted through the swash plate 64. The cradle bearing 74, the swash plate convex surface 70, the swash plate inward surface 100 and the swash plate annular groove 104 may be dimensioned to ensure that the swash plate inner edge 106 engages the bearing concave surface 78 at a point that is opposite the undercut surface 116 of the bearing convex surface 90. Relative lateral movement may occur between the swash plate 64, the cradle bearing 74 and/or the housing concave surface 76 if unconstrained by fastening mechanisms limiting the components to relative rotational movement for adjustment of the swash plate tilt angle. Where such lateral movement occurs, the swash plate inward shoulder 102 may engage the bearing inner end surface 98 to prevent the swash plate inner edge 106 from being repositioned past the undercut surface 116 and undercut transition portion 114, and into the housing engaging surface 112.

Figure 7:
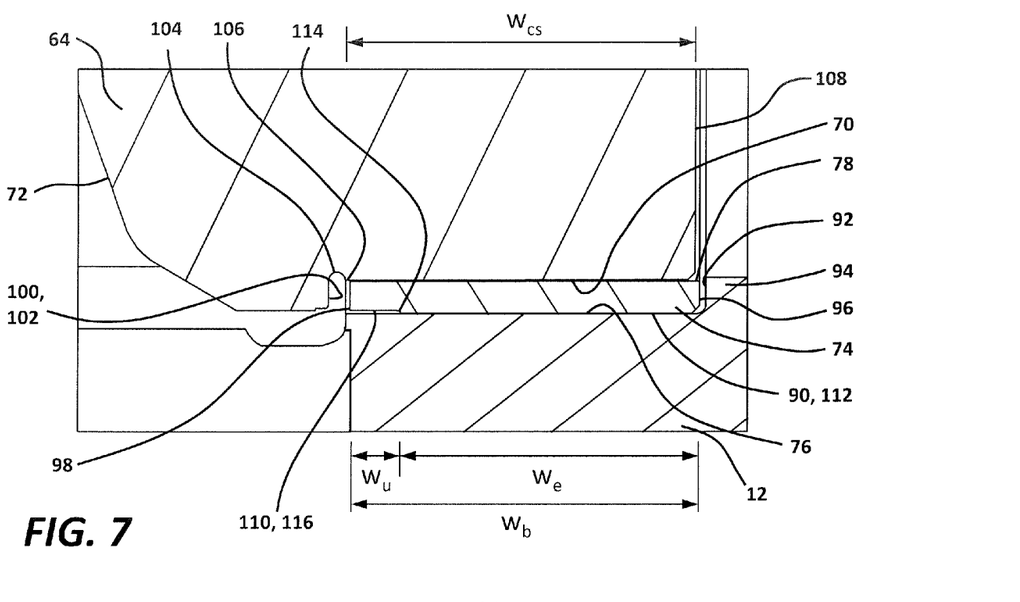
FIG. 7 is the side cross-sectional view of the piston pump assembly of FIG. 3 with an alternative swash plate embodiment.

In an alternative embodiment shown in FIG. 7, the main housing portion 12, the swash plate 64 and the cradle bearing 74 may be dimensioned so that the swash plate inner edge 106 is disposed inwardly of the bearing inner end surface 98 while still providing stress reduction during pressure loading from the piston pumps 20, 22 and bowing of the swash plate 64. Instead of relying on engagement between the bearing inner end surface 98 and the swash plate inward surface 100 to limit the lateral movement of the swash plate 64, the housing lateral surface 92 on either side of the main housing portion 12 may engage the corresponding swash plate outer end surfaces 108 to prevent substantial lateral movement of the swash plate 64. With the position of the swash plate 64 controlled by the main housing portion 12, the swash plate convex surface 70 may be dimensioned with the convex surface width $w_{cs}$ being greater than the overall bearing width $w_b$ so that the swash plate inner edge 106 extends inwardly beyond the bearing inner end surface 98. Under this arrangement, the stresses in the pump body/cradle bearing/swash plate area may be reduced as discussed further below.

INDUSTRIAL APPLICABILITY

The configuration of the pump assembly 10 as illustrated and described herein provides reduce stresses in the components in the pump body/cradle bearing/swash plate area that are present in previous pump assemblies. As downward forces generated by the compression of hydraulic fluid in the pump cylinders of the pump barrel 56 are transmitted through the swash plate 64 to the cradle bearings 74, the forces are initially distributed across the swash plate convex surface 70 and the bearing concave surface 78. As the pressure force increases in the embodiment of FIG. 3, the swash plate inner edge 106 tends to function as a fulcrum about which the bowing swash plate 64 pivots counterclockwise as viewed in FIG. 3 relative to the cradle bearing 74 and thereby concentrating the force along the swash plate inner edge 106 creating stress concentrations in the swash plate 64 and the cradle bearing 74 in previous pump assemblies. In the pump assembly 10 in accordance with the present disclosure, the undercut gap 118 allows the portion of the cradle bearing 74 above the undercut surface 116 to deflect and the corresponding portion of the bearing concave surface 78 to remain in contact with the swash plate convex surface 70 to distribute the pressure force from the undercut transition portion 114 to the swash plate inner edge 106 and reduce the stress concentrations in the swash plate 64 and the cradle bearing 74. A corresponding bending moment is created in the cradle bearing 74 above the undercut transition portion 114, with the bending stresses being distributed across the thickness of the cradle bearing 74. In the embodiment of FIG. 7, stress concentrations at the point of contact between the swash plate convex surface 70 and the edge at the intersection of the bearing concave surface 78 and the bearing inner end surface 98 are distributed across the entire undercut width $w_u$ of the bearing concave surface 78. In these embodiments, the deflection of the cradle bearing allows the increased contact pressure at the swash plate inner edge 106 or at the intersection of the bearing concave surface 78 and the bearing inner end surface 98 to be further distributed across the swash plate convex surface 70 and the bearing concave surface 78.

In one exemplary implementation of the cradle bearings 74 in accordance with the present disclosure, the cradle bearings 74 are implemented in a 260 cc pump assembly 10. In this embodiment, the cradle bearings 74 may have a bearing width $w_b$ equal to approximately 34.25 millimeters (approximately 1.348 inches), an engagement width $w_e$ equal to approximately 29.25 millimeters (approximately 1.152 inches), and an undercut width $w_u$ equal to approximately 5.00 millimeters (approximately 0.1969 inch). The cradle bearing 74 may also have an housing engagement thickness $t_e$ equal to approximately 3.1 millimeters (approximately 0.122 inch) and an undercut thickness $t_u$ equal to approximately 2.9 millimeters (approximately 0.1142 inch), thereby giving the gap 118 a gap width $t_g$ equal to approximately 0.2 millimeters (approximately 0.007874 inch). With these approximate dimensions, the engagement width $w_e$ of the cradle bearing 74 has a value within a range of 84% to 86% of the value of the bearing width $w_b$ and may have a value equal to approximately 85.4% of the value of the bearing width $w_b$. The convex surface width $w_{cs}$ of the swash plate 64 has a value within a range of 86% to 88% of the value of the bearing width $w_b$ and may have a value equal to approximately 87.3% of the value of the bearing width $w_b$. Additionally, the gap width tg of the gap 118 has a value within a range of 0.05% to 0.07% of the value of the engagement thickness $t_e$ and may have a value equal to approximately 0.06% of the value of the engagement thickness $t_e$.

These values are exemplary only, and may vary based on the particular implementation of the cradle bearings 74. For example, the values of the widths and the thicknesses may increase and decrease correspondingly as the size of the pump in which the cradle bearings 74 is implemented increases and decreases. Additionally, even within the same pump size, the dimensions of the cradle bearings 74 and the swash plate convex surfaces 70 may be adjusted as necessary based on the operating conditions in a particular environment in which the pump is implemented, such as variations in the pressure generated within the pump cylinders. Consequently, the widths and thicknesses may be varied for a desired distribution of stresses cause by the moment about the swash plate inner edge 106 so long as the swash plate inner edge 106 engages the bearing concave surface 78 opposite the undercut surface 116 of the bearing convex surface 90.

Figure 8:
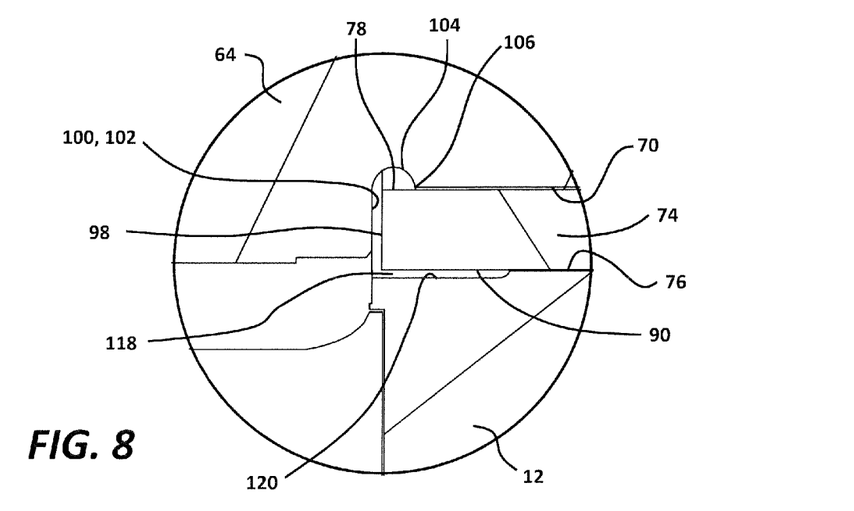
FIG. 8 is the enlarged view of Detail 6 of an alternative embodiment of the piston pump assembly of FIG. 3 having an undercut in the housing concave surface.

Additional alternate embodiments of the cradle bearings 74, the swash plate convex surfaces 70 and/or the housing concave surfaces 76 may be implemented. For example, though each of the surfaces 70, 76, 78 and 90 as illustrated have a generally linear profile as they extend laterally between the bearing outer end surface 96 and the bearing inner end surface 98 as shown in FIGS. 3 and 6, the complimentary surfaces 70/78 and/or 76/90 may have curvature as they extend between the end surfaces 96, 98 if necessary to achieve a desired performance of the piston pump assembly 10. Such configurations may cause the engagement thickness $t_e$ and/or the undercut thickness $t_u$ to vary as the cradle bearing 74 extends laterally within the main housing portion 12. Despite such curvature and thickness variations, the bearing convex surface 90 may still include an undercut surface 116 combining with the corresponding portion of the housing concave surface 76 to define the gap 118 there between. In further alternative embodiments, the housing concave surface 76 may include an undercut surface 120 as an alternative to (FIG. 8) or in addition to the undercut surface 116 of the bearing convex surface 90 forming the gap 118 there between. Additional alternative configurations of the main housing portion 12, the swash plate 64 and/or the cradle bearings 74 in which the gap 118 is formed to reduce stress concentrations in the pump housing/cradle bearing/swash plate area will be apparent to those skilled in the art and are contemplated by the inventors as having use in piston pump assembly 10 in accordance with the present disclosure.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

What is claimed is:

1. A cradle bearing for use with a swash plate in a piston pump assembly, the cradle bearing comprising:
   a bearing outer end surface;
   a bearing inner end surface disposed opposite the bearing outer end surface and spaced from the bearing outer end surface by a bearing width;
   a bearing concave inner surface extending from the bearing outer end surface to the bearing inner end surface; and
   a bearing convex outer surface disposed opposite the bearing concave inner surface and extending from the bearing outer end surface to the bearing inner end surface, the bearing convex outer surface comprising:
      a housing engaging surface extending from the bearing outer end surface toward the bearing inner end surface, wherein the cradle bearing has an engagement thickness from the bearing concave inner surface to the housing engaging surface of the bearing convex outer surface;
      an undercut surface extending from the bearing inner end surface toward the bearing outer end surface to a point of transition with the housing engaging surface, wherein the cradle bearing has an undercut thickness from the bearing concave inner surface to the undercut surface of the bearing convex outer surface that is less than the engagement thickness of the cradle bearing;
   wherein the swash plate has a swash plate outer end surface and a swash plate convex surface extending inwardly from the swash plate outer end surface to a swash plate inner edge and having a complimentary shape to the bearing concave inner surface for receipt therein to facilitate rotational motion of the swash plate relative to the cradle bearing;
   wherein the swash plate convex surface has a convex surface width from the swash plate outer end surface to the swash plate inner edge, the housing engaging surface has a housing engaging width from the bearing outer end surface to the point of transition, and the undercut surface has an undercut width from the bearing inner end surface to the point of transition; and
   wherein the housing engaging width and the undercut width are determined relative to the convex surface width so that the swash plate inner edge engages the bearing concave inner surface at a point opposite the undercut surface of the bearing convex outer surface.

2. The cradle bearing of claim 1, wherein the housing engaging width has a value that is approximately equal to 85.4% of the bearing width.

3. The cradle bearing of claim 1, wherein the engagement thickness is constant across the housing engaging width from the bearing outer end surface to the point of transition.

4. The cradle bearing of claim 1, wherein the undercut thickness is constant across the undercut width from the bearing inner end surface to the point of transition.

5. The cradle bearing of claim 1, wherein the bearing convex outer surface comprises a transition portion at the point of transition between the housing engaging surface and the undercut surface, wherein the transition portion extends from the housing engaging surface to the undercut surface and perpendicular to the housing engaging surface and the undercut surface.

6. The cradle bearing of claim 1, wherein the bearing convex outer surface comprises a transition portion at the point of transition between the housing engaging surface and the undercut surface, wherein the transition portion has a transition curved surface as the transition portion extends from the housing engaging surface to the undercut surface.

7. The cradle bearing of claim 1, wherein the bearing concave inner surface and the bearing convex outer surface are circular arcs having a common center of curvature.

8. A piston pump assembly for a piston pump, comprising:
   a piston housing having a pair of oppositely disposed housing concave surfaces;
   a swash plate having a pair of oppositely disposed swash plate convex surfaces, each of the pair of oppositely disposed swash plate convex surfaces corresponding to one of the pair of oppositely disposed housing concave surfaces;
   a pair of cradle bearings with each of the pair of cradle bearings corresponding to and disposed between one of the pair of oppositely disposed swash plate convex surfaces and a corresponding housing concave surface to facilitate rotational motion of the swash plate relative to the piston housing, each of the pair of cradle bearings having a bearing concave inner surface having a complimentary shape to the pair of oppositely disposed swash plate convex surfaces, a housing engaging surface disposed opposite the bearing concave inner surface by a cradle bearing thickness and having a complimentary shape to the pair of oppositely disposed housing concave surfaces, and an undercut surface disposed opposite the bearing concave inner surface by an undercut thickness and extending from a bearing inner end surface toward a bearing outer end surface to a point of transition with the housing engaging surface, wherein the undercut thickness is less than the cradle bearing thickness to define a gap between the undercut surface and the corresponding housing concave surface;

wherein each of the pair of oppositely disposed swash plate convex surfaces extends inwardly from a corresponding swash plate outer end surface to a corresponding swash plate inner edge;

wherein each swash plate convex surface has a convex surface width from the corresponding swash plate outer end surface to the corresponding swash plate inner edge, the housing engaging surface of each cradle bearing has a housing engaging width from the bearing outer end surface to the point of transition, and the undercut surface of each of the pair of cradle bearings has an undercut width from the bearing inner end surface to the point of transition; and wherein the housing engaging width and the undercut width are determined relative to the convex surface width so that the corresponding swash plate inner edge engages the bearing concave inner surface at a point opposite the undercut surface.

9. The piston pump assembly of claim 8, wherein the bearing concave inner surface and the housing engaging surface for each cradle bearing are circular arcs having a common center of curvature.

10. The piston pump assembly of claim 8, wherein each cradle bearing has a bearing width from the bearing outer end surface to the bearing inner end surface, and wherein the housing engaging width has a value that is approximately equal to 85.4% of the bearing width.

11. The piston pump assembly of claim 8, wherein the cradle bearing thickness for each of the pair of cradle bearings is constant across the housing engaging width from the bearing outer end surface to the point of transition.

12. The piston pump assembly of claim 8, wherein the undercut thickness for each cradle bearing is constant across the undercut width from the bearing inner end surface to the point of transition.

13. The piston pump assembly of claim 8, wherein each cradle bearing comprises a transition portion at the point of transition between the housing engaging surface and the undercut surface, wherein the transition portion extends from the housing engaging surface to the undercut surface and perpendicular to the housing engaging surface and the undercut surface.

14. The piston pump assembly of claim 8, wherein each cradle bearing comprises a transition portion at the point of transition between the housing engaging surface and the undercut surface, wherein the transition portion has a transition curved surface as the transition portion extends from the housing engaging surface to the undercut surface.

15. A cradle bearing for use with a swash plate in a piston pump assembly, the cradle bearing comprising:
 a bearing outer end surface;
 a bearing inner end surface disposed opposite the bearing outer end surface and spaced from the bearing outer end surface by a bearing width;
 a bearing concave inner surface extending from the bearing outer end surface to the bearing inner end surface; and
 a bearing convex outer surface disposed opposite the bearing concave inner surface and extending from the bearing outer end surface to the bearing inner end surface, the bearing convex outer surface comprising:
  a housing engaging surface extending from the bearing outer end surface toward the bearing inner end surface, wherein the cradle bearing has an engagement thickness from the bearing concave inner surface to the housing engaging surface of the bearing convex outer surface;
  an undercut surface extending from the bearing inner end surface toward the bearing outer end surface to a point of transition with the housing engaging surface, wherein the cradle bearing has an undercut thickness from the bearing concave inner surface to the undercut surface of the bearing convex outer surface that is less than the engagement thickness of the cradle bearing; and
  wherein the housing engaging surface has a housing engaging width from the bearing outer end surface to the point of transition, and wherein the housing engaging width has a value that is approximately equal to 85.4% of the bearing width.

16. The cradle bearing of claim 15, wherein the swash plate has a swash plate outer end surface and a swash plate convex surface extending inwardly from the swash plate outer end surface to a swash plate inner edge and having a complimentary shape to the bearing concave inner surface for receipt therein to facilitate rotational motion of the swash plate relative to the cradle bearing, wherein the swash plate convex surface has a convex surface width from the swash plate outer end surface to the swash plate inner edge, and the undercut surface has an undercut width from the bearing inner end surface to the point of transition, and wherein the housing engaging width and the undercut width are determined relative to the convex surface width so that the swash plate inner edge engages the bearing concave inner surface at a point opposite the undercut surface of the bearing convex outer surface.

17. The cradle bearing of claim 15, wherein the engagement thickness is constant across the housing engaging width from the bearing outer end surface to the point of transition.

18. The cradle bearing of claim 15, wherein the undercut thickness is constant across an undercut width from the bearing inner end surface to the point of transition.

19. The cradle bearing of claim 15, wherein the bearing convex outer surface comprises a transition portion at the point of transition between the housing engaging surface and the undercut surface, wherein the transition portion extends from the housing engaging surface to the undercut surface and perpendicular to the housing engaging surface and the undercut surface.

20. The cradle bearing of claim 15, wherein the bearing convex outer surface comprises a transition portion at the point of transition between the housing engaging surface and the undercut surface, wherein the transition portion has a transition curved surface as the transition portion extends from the housing engaging surface to the undercut surface.

21. The cradle bearing of claim 15, wherein the bearing concave inner surface and the bearing convex outer surface are circular arcs having a common center of curvature.

* * * * *